United States Patent
Choi et al.

(10) Patent No.: US 12,046,727 B2
(45) Date of Patent: Jul. 23, 2024

(54) METHOD FOR RECOVERY OF VALUABLE METALS FROM SPENT SECONDARY BATTERIES

(71) Applicant: KOREA ZINC CO., LTD., Seoul (KR)

(72) Inventors: Heon Sik Choi, Ulsan (KR); Tae Hoon Yoon, Ulsan (KR)

(73) Assignee: KOREA ZINC CO., LTD., Seoul (KR)

( * ) Notice: Subject to any disclaimer, the term of this patent is extended or adjusted under 35 U.S.C. 154(b) by 0 days.

(21) Appl. No.: 18/472,372

(22) Filed: Sep. 22, 2023

(65) Prior Publication Data

US 2024/0063454 A1 Feb. 22, 2024

Related U.S. Application Data

(63) Continuation of application No. PCT/KR2023/009404, filed on Jul. 4, 2023.

(30) Foreign Application Priority Data

Aug. 16, 2022 (KR) .................. 10-2022-0102031
Sep. 5, 2022 (KR) .................. 10-2022-0112306

(51) Int. Cl.
| | | |
|---|---|---|
| H01M 10/54 | (2006.01) | |
| B03B 9/06 | (2006.01) | |
| B09B 3/35 | (2022.01) | |
| B09B 3/40 | (2022.01) | |
| B09B 3/70 | (2022.01) | |

(Continued)

(52) U.S. Cl.
CPC ............... *H01M 10/54* (2013.01); *B03B 9/06* (2013.01); *B09B 3/35* (2022.01); *B09B 3/40* (2022.01); *B09B 3/70* (2022.01); *C01D 15/04* (2013.01); *B03B 2009/066* (2013.01); *B09B 2101/16* (2022.01)

(58) Field of Classification Search
CPC ... B09B 3/35; B09B 3/40; B09B 3/70; H01M 10/54
USPC .................................................. 241/23
See application file for complete search history.

(56) References Cited

U.S. PATENT DOCUMENTS

2013/0312254 A1  11/2013  Kim et al.
2022/0017990 A1  1/2022   Scheunis et al.

FOREIGN PATENT DOCUMENTS

| CN | 112531159 A | 3/2021 |
|---|---|---|
| EP | 4113700 A1 | 1/2023 |
| JP | 2014122369 A | 7/2014 |

(Continued)

OTHER PUBLICATIONS

International Search Report (with English translation) issued in PCT/KR2023/009404, dated Oct. 13, 2023, 7 pages provided.

*Primary Examiner* — Christopher L Templeton
*Assistant Examiner* — P Derek Pressley
(74) *Attorney, Agent, or Firm* — HSML P.C.

(57) ABSTRACT

A method for recovering valuable metals from a spent secondary battery includes a pre-processing process of pre-processing the spent secondary battery, a melting process of heating the pre-processed spent secondary battery to generate a molten solution, and a recovery process of recovering the valuable metals from the molten solution. In the melting process, a chlorinating agent is added, and, in the recovery process, lithium is recovered in a form of lithium dust.

8 Claims, 2 Drawing Sheets

(51) Int. Cl.
*B09B 101/16* (2022.01)
*C01D 15/04* (2006.01)

(56) References Cited

FOREIGN PATENT DOCUMENTS

| | | | | |
|---|---|---|---|---|
| JP | 2022507413 A | 1/2022 | | |
| KR | 1020120094619 A | 8/2012 | | |
| KR | 20180102092 | * 1/2017 | .............. | C22B 7/04 |
| KR | 1020200065503 A | 6/2020 | | |
| KR | 102541261 | * 6/2021 | ............ | C01B 25/30 |
| KR | 1020210131258 A | 11/2021 | | |
| TW | 202026244 A | 7/2020 | | |
| WO | 2020104164 A1 | 5/2020 | | |
| WO | 2022098303 A | 5/2022 | | |
| WO | 2022234884 A1 | 11/2022 | | |

* cited by examiner

METHOD FOR RECOVERY OF VALUABLE METALS FROM SPENT SECONDARY BATTERIES

TECHNICAL FIELD

The present disclosure relates to a method for recovering valuable metals from spent secondary batteries.

BACKGROUND

With the recent rapid growth of the electric vehicle market, there has been a significant increase in demand for secondary batteries (e.g., lithium-ion batteries) used as a power source for electric vehicles. Secondary batteries for electric vehicles contain significant amounts of valuable metals such as nickel, cobalt, copper, and lithium. Consequently, there has been increasing research on methods for recovering and recycling these valuable metals from spent secondary batteries used in electric vehicles.

The methods for recovering valuable metals from spent secondary batteries for electric vehicles may be divided into two categories: a pyrometallurgical method, which includes melting spent secondary batteries for electric vehicles in a furnace to separate and concentrate the valuable metals from slag; and a hydrometallurgical method, which includes leaching and further refining valuable metals with acid.

The pyrometallurgical method is suitable for processing a large amount of spent secondary batteries for electric vehicles, and has the advantage of directly separating and recovering nickel, cobalt, and copper from slag. However, since lithium is mostly discharged as slag, recovering it requires additional processes to leach lithium from the slag, which in turn necessitates large-capacity additional facilities, posing a disadvantage.

The hydrometallurgical method, on the other hand, has the disadvantage of generating a large amount of wastewater due to the use of high-concentration acid and neutralizing agents. Additionally, it has limitations in handling a large amount of spent secondary batteries for electric vehicles as it proceeds without removal of substances such as aluminum, iron, and carbon.

SUMMARY

An object of the present disclosure is to provide a method for easily recovering valuable metals such as nickel, cobalt, copper, and lithium from spent secondary batteries.

To address the above-described task, a method for recovering valuable metals from a spent secondary battery according to one embodiment of the present disclosure includes a pre-processing process of pre-processing the spent secondary battery, a melting process of heating the pre-processed spent secondary battery to generate a molten solution, and a recovery process of recovering the valuable metals from the molten solution. In the melting process, a chlorinating agent is added, and, in the recovery process, lithium is recovered in a form of lithium dust.

According to one embodiment of the present disclosure, the chlorinating agent includes at least one of $CaCl_2$, $CuCl_2$, NaCl, KCl, or CuCl According to one embodiment of the present disclosure, the chlorinating agent includes $CaCl_2$) or $CuCl_2$.

According to one embodiment of the present disclosure, the chlorinating agent is added such that an equivalent of chlorine to lithium present in the pre-processed spent secondary battery is 1.2 or more.

According to one embodiment of the present disclosure, the pre-processed spent secondary battery is heated to a temperature of 1500 degrees C. or higher in the melting process.

According to one embodiment of the present disclosure, the lithium dust is LiCl.

According to one embodiment of the present disclosure, a slag generated in the melting process is $CaO$—$SiO_2$—$Al_2O_3$ 3-phase slag.

According to one embodiment of the present disclosure, a composition of the slag is 21~28% $CaO$, 55~63% $SiO_2$, and 12~17% $Al_2O_3$.

According to one embodiment of the present disclosure, the method further includes a spent secondary battery composition analysis process of analyzing a composition of the pre-processed spent secondary battery, and, based on a composition analysis result of the pre-processed spent secondary battery, an input amount of flux is adjusted to achieve the slag composition of 21~28% $CaO$, 55~63% $SiO_2$, and 12~17% $Al_2O_3$.

According to one embodiment of the present disclosure, a slag composition analysis process is performed to analyze the composition of the slag generated during the melting process, and, based on a composition analysis result of the slag, an additional input amount of flux is adjusted to achieve the slag composition of 21~28% $CaO$, 55~63% $SiO_2$, and 12~17% $Al_2O_3$.

According to one embodiment of the present disclosure, the pre-processing process includes a discharge process of discharging the spent secondary battery, a disassembling process of disassembling the spent secondary battery from a pack to a module, a shredding/pulverizing process of shredding and pulverizing the disassembled spent secondary battery, and a drying process of drying the shredded/pulverized spent secondary battery.

According to the present disclosure, nickel, cobalt, and copper can be reduced and separated from slag through a melting process for effective recovery.

According to the present disclosure, lithium can be transformed into a lithium chloride during a melting process by adding a chlorinating agent, enabling the recovery of lithium in the form of lithium dust without an additional process to recover lithium from slag.

DETAILED DESCRIPTION

Hereinafter, the present disclosure will be described with reference to the drawings.

Figure 1:
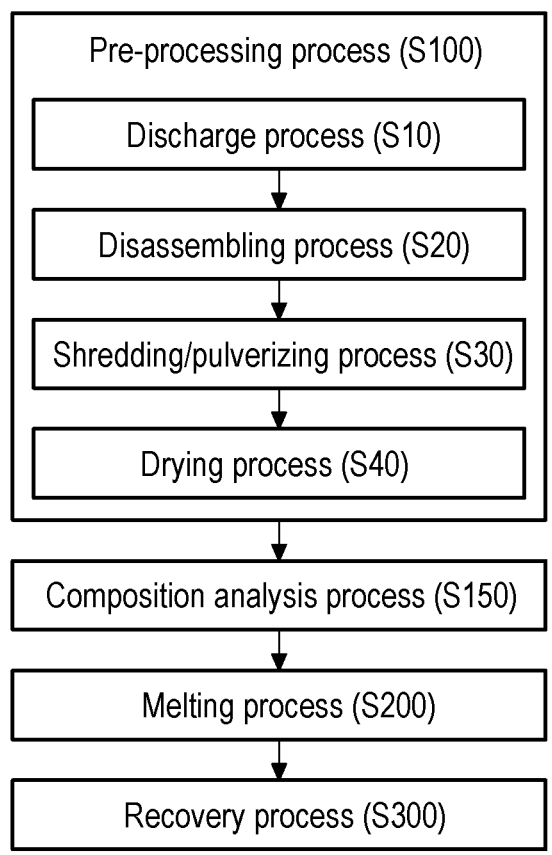
FIG. 1 is a process flow chart of a method for recovering valuable metals from spent secondary batteries according to an embodiment of the present disclosure.

FIG. 1 is a process flow chart of a method for recovering valuable metals from spent secondary batteries according to an embodiment of the present disclosure.

Referring to FIG. 1, the method for recovering valuable metals from spent secondary batteries according to an embodiment of the present disclosure includes a pre-processing process S100, a melting process S200, and a recovery process S300.

Pre-Processing Process S100

A pre-processing process S100 is a process performed before melting spent secondary batteries, and can include a discharge process S10, disassembling process S20, shredding/pulverizing process S30, and drying process S40.

Discharge Process S10

The discharge process S10 is a process of discharging power accumulated in the spent secondary batteries to prevent potential explosion of the spent secondary batteries during subsequent processes. The discharge process S10 can be carried out through methods such as discharge using a discharger or saline water discharge using a saline water. For example, through the discharge process S10, the charge rate of the spent secondary batteries can be reduced to 20% or lower.

Disassembling Process S20

The disassembling process S20 is a process of disassembling the spent secondary batteries from a pack to the unit of modules or cells. In an embodiment, as illustrated in FIG. 1, the disassembling process S20 may be carried out after the discharge process S10. However, the present disclosure is not limited thereto. In another embodiment, contrary to FIG. 1, the disassembling process S20 may be carried out first, and then the discharge process S10 may be carried out. The disassembling process S20 may be carried out using automated disassembling equipment, for example.

Shredding/Pulverizing Process S30

The shredding/pulverizing process S30 is a process of shredding and pulverizing the disassembled spent secondary batteries into a shredded material. The shredding/pulverizing process S30 may be carried out under a nitrogen atmosphere while spraying water to prevent sparks and explosions. After the shredding/pulverizing process, the sprayed water and electrolytes that are flowing from the spent secondary batteries may be removed. For example, the water and the electrolytes may be removed using a centrifugal separation method by a rotary barrel.

Drying Process S40

The drying process S40 is a process to remove the remaining water and electrolytes after the shredding/pulverizing process S30. For example, the drying process S40 can be carried out by supplying a nitrogen gas heated to approximately 50 degrees C. or higher into a dryer in which the shredded material is placed.

Composition Analysis Process S150

In an embodiment of the present disclosure, a composition analysis process S150 may be carried out to analyze the composition of the spent secondary batteries subjected to the pre-processing process S100 (hereinafter referred to as "pre-processed spent secondary batteries"). The composition analysis result of the pre-processed spent secondary batteries may be used to determine the components and content of a flux to be added in the melting process S200 to be described later. In contrast, in another embodiment of the present disclosure (for example, when the composition of the pre-processed spent secondary batteries is already known), the composition analysis process S150 may be omitted.

Melting Process S200

A melting process S200 is a process of heating the pre-processed spent secondary batteries to achieve melting of the pre-processed spent secondary batteries. Specifically, the melting process S200 includes melting the pre-processed spent secondary batteries after mixing them with a flux and a chlorinating agent. This may be performed by heating them at a temperature of 1,500 degrees C. or higher for approximately 3 to 5 hours. During the heating, air, particularly air mixed with oxygen, more preferably oxygen may be added. This allows for the oxidation of by-products such as carbon, aluminum, manganese, and iron present in the pre-processed spent secondary batteries. Carbon can be oxidized and emitted as a carbon dioxide or carbon monoxide gas, while oxides of aluminum, manganese, iron, residual carbon, and others may be incorporated into slag as will be described later. If the heating temperature in the melting process S200 is below than 1,500 degrees C., it may not provide sufficient reactivity, leading to a decrease in the recovery rate of lithium in subsequent processes.

The flux contains $SiO_2$ and $CaCO_3$, resulting in the formation of $CaO$—$SiO_2$—$Al_2O_3$ 3-phase slag along with an oxidation product of aluminum ($Al_2O_3$) present in the spent secondary batteries. In addition, the slag may contain byproducts present in the pre-processed spent secondary batteries such as manganese, iron, carbon, as well as a portion of nickel, cobalt, copper, and lithium.

Figure 2:
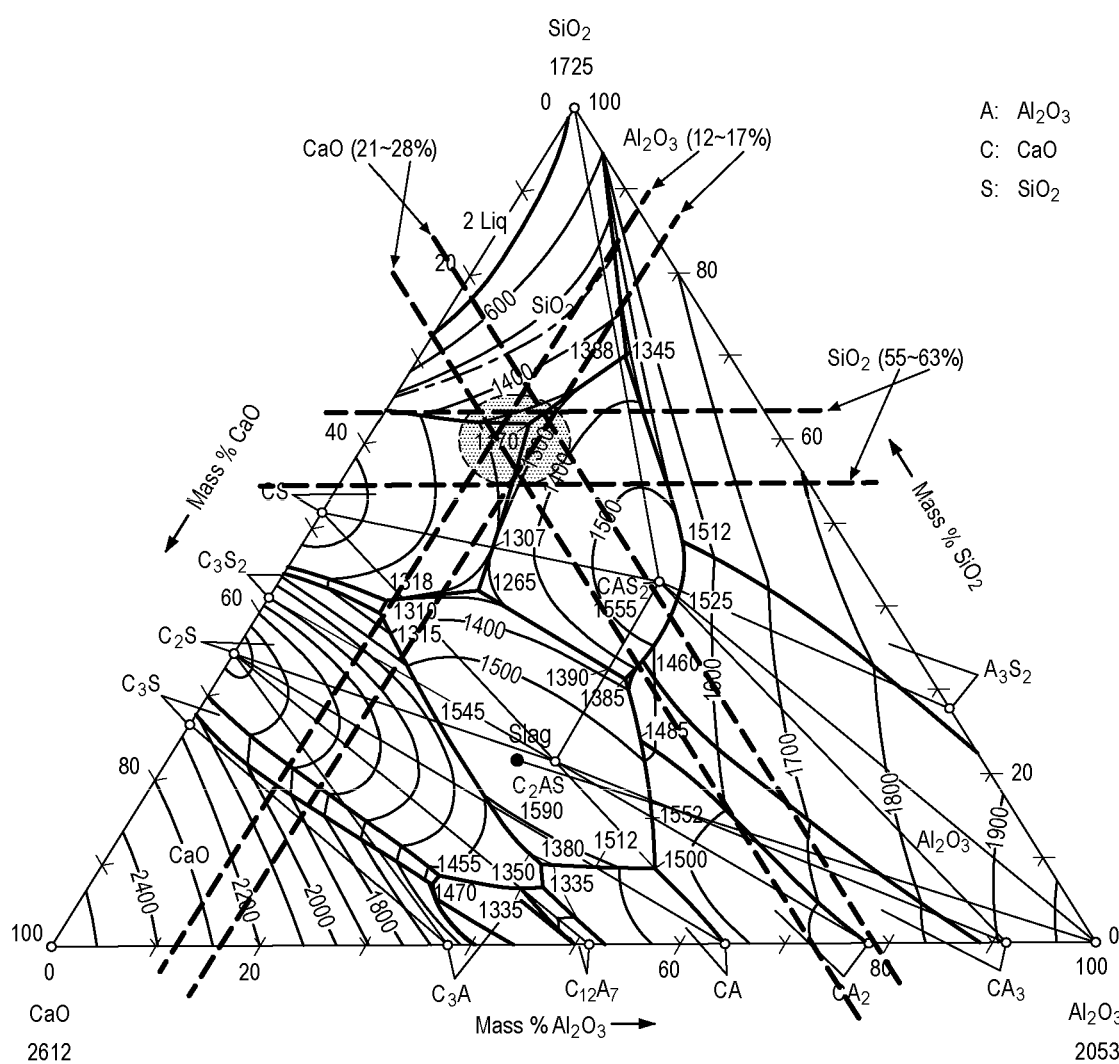
FIG. 2 is a phase diagram of $CaO$—$SiO_2$—$Al_2O_3$ 3-phase slag.

The composition of the 3-phase slag generated in the melting process S200 is desirably 21~28% CaO, 55~63% $SiO_2$, and 12~17% $Al_2O_3$, and the input amount of the flux (the components and content of the input flux) is adjusted to achieve the above composition of the slag. In this case, the melting point of the slag is approximately 1,200 degrees C. (see FIG. 2). The adjustment of the input amount of the flux may be based on the composition analysis result of the pre-processed spent secondary batteries obtained from the composition analysis process S150. Specifically, the input amount of $SiO_2$ and $CaCO_3$ may be adjusted to achieve the composition of 21-28% CaO, 55-63% $SiO_2$, and 12~17% $Al_2O_3$ in the 3-phase slag, based on the composition of the pre-processed spent secondary batteries.

Furthermore, a process can be carried out to analyze the composition of the slag generated during the melting process S200. In this case, based on the composition analysis result of the generated slag, the input amount of the flux during the melting process S200 may be adjusted to achieve a desirable composition of 21~28% CaO, 55~63% $SiO_2$, and 12~17% $Al_2O_3$ of the 3-phase slag. Specifically, the input amount of $SiO_2$ and $CaCO_3$ to be additionally added may be adjusted to achieve the composition of 21-28% CaO, 55-63% $SiO_2$, and 12~17% $Al_2O_3$ of the 3-phase slag, based on the composition of the slag.

The chlorinating agent can include at least one of $CaCl_2$, $CuCl_2$, NaCl, KCl, or CuCl, and can be added such that the equivalent of chlorine to lithium present in the pre-processed spent secondary batteries may be 1.2 or more. If the equivalent of the chlorinating agent is less than 1.2, a chlorination reaction of lithium cannot proceed sufficiently, resulting in a lower lithium recovery rate in subsequent processes.

During the melting process S200, nickel, cobalt, and copper present in the pre-processed spent secondary batteries are reduced from oxides. The relevant reaction is represented by the following Equation (1).

$$MO+C=CO+M(M=Ni,Co,Cu) \qquad \text{Eq. (1)}$$

The reduced nickel, cobalt, and copper exist in the form of a molten solution and, due to the difference in specific gravity from the slag, exist separately under the slag.

During the melting process S200, lithium present in the pre-processed spent secondary batteries undergoes a chlorination reaction with the chlorinating agent, resulting in the formation of a lithium chloride (LiCl). The relevant reaction is represented by the following Equation (2), Equation (3), and Equation (4).

$$Li_2O+SiO_2+MCl_2=2LiCl+MSiO_3(M=Ca,Cu) \qquad \text{Eq. (2)}$$

$$Li_2O+2SiO_2+Al_2O_3+MCl_2=2LiCl+MAl_2Si_2O_8 \\ (M=Ca,Cu) \qquad \text{Eq. (3)}$$

$$Li_2O+6SiO_2+Al_2O_3+2MCl=2LiCl+2MAlSi_3O_8 \\ (M=Na,K,Cu) \qquad \text{Eq. (4)}$$

Specifically, if $CaCl_2$ or $CuCl_2$ is used as the chlorinating agent, a lithium chloride can be generated through Equation (2) and Equation (3), and if NaCl, KCl, or CuCl is used as the chlorinating agent, a lithium chloride can be generated through Equation (4).

Recovery Process S300

A recovery process S300 is a process of recovering nickel, cobalt, copper, and the lithium chloride (LiCl).

The molten solution of nickel, cobalt, and copper generated by reduction in the melting process S200 has a higher specific gravity than the slag, allowing it to exist separately under the slag. This property can be utilized to separate and recover nickel, cobalt, and copper from the slag.

The boiling point of the lithium chloride (LiCl) generated in the melting process S200 is approximately 1,382 degrees C., which means that it can vaporize and form a dust-like substance during the melting process S200. The dust-like lithium chloride (LiCl) can be collected and recovered through a dust collector such as an electrostatic precipitator or a bag filter.

Hereinafter, the present disclosure will be described in detail through examples and a comparative example. In the examples, the above-described processes were utilized to recover valuable metals, namely nickel, cobalt, copper, and lithium, from the spent secondary batteries, and the recovery rate of these metals were measured. On the other hand, in the comparative example, the melting process S200 was performed without the addition of the chlorinating agent, and the recovery rates of valuable metals, namely nickel, cobalt, copper, and lithium, were measured. The recovery rates of nickel, cobalt, copper, and lithium were calculated by subtracting the amount discharged as the slag from the input amount. The composition of the shredded spent secondary batteries powder (pre-processed spent secondary batteries) used in the examples and the comparative example is presented in Table 1 below.

TABLE 1

| Component | Ni | Co | Cu | Li | Mn | Al | Fe | C |
|---|---|---|---|---|---|---|---|---|
| Content (%) | 17.0 | 5.7 | 9.2 | 3.3 | 5.7 | 10.2 | 0.1 | 28.8 |

COMPARATIVE EXAMPLE

In Comparative Example, 100 g of shredded spent secondary batteries powder was mixed with a flux composed of 82.2 g of $SiO_2$ and 57.0 g of $CaCO_3$ without the addition of a chlorinating agent, and then a melting process was performed with injection of oxygen at 1,500 degrees C. for 3 hours.

Examples 1-5

In Examples 1 to 5, the recovery rates of valuable metals were investigated based on the temperature in the melting process S200.

Specifically, 100 g of shredded spent secondary batteries powder was mixed with a flux composed of 82.2 g of $SiO_2$ and 21.3 g of $CaCO_3$, and 39.6 g of $CaCl_2$) as a chlorinating agent (with the equivalent of chlorine to lithium: 1.5) and then a melting process was performed with injection of oxygen for 3 hours. The melting temperature was set at 1300 degrees C. for Example 1, 1350 degrees C. for Example 2, 1400 degrees C. for Example 3, 1450 degrees C. for Example 4, and 1500 degrees C. for Example 5.

The experimental conditions and recovery rates of valuable metals in Examples 1 to 5 and Comparative Example are presented in Table 2.

TABLE 2

| | | Example 1 | Example 2 | Example 3 | Example 4 | Example 5 | Comparative Example |
|---|---|---|---|---|---|---|---|
| Input Amount (g) | Shredded Spent Secondary Batteries | 100.0 | 100.0 | 100.0 | 100.0 | 100.0 | 100.0 |
| | $SiO_2$ | 82.2 | 82.2 | 82.2 | 82.2 | 82.2 | 82.2 |
| | $CaCO_3$ | 21.3 | 21.3 | 21.3 | 21.3 | 21.3 | 57.0 |
| | $CaCl_2$ | 39.6 (Equivalent of 1.5) | 39.6 (Equivalent of 1.5) | 39.6 (Equivalent of 1.5) | 39.6 (Equivalent of 1.5) | 39.6 (Equivalent of 1.5) | |
| Melting Process Conditions | Temperature (degrees C.) | 1,300 | 1,350 | 1,400 | 1,450 | 1,500 | 1,500 |
| | Reaction Time (hr) | 3 | 3 | 3 | 3 | 3 | 3 |
| Recovery Rate (%) | Ni | 97.7 | 97.9 | 98.2 | 98.7 | 99.2 | 99.2 |
| | Co | 97.3 | 97.8 | 97.9 | 98.5 | 98.6 | 98.4 |
| | Cu | 86.7 | 95.3 | 97.5 | 98.0 | 98.7 | 98.5 |
| | Li | 47.4 | 54.5 | 60.6 | 78.3 | 91.5 | 0.2 |

As can be seen in Table 2, in Examples 1 to 5, lithium was successfully recovered without the need for additional processes for slag. Further, in Examples 1 to 5, higher temperatures in the melting process resulted in higher recovery rates of valuable metals, especially lithium. Particularly in Example 5 which had a temperature of 1500 degrees C. in the melting process, a high lithium recovery rate of 91.5% was achieved.

On the other hand, in Comparative Example where no chlorinating agent was added during the melting process, most of lithium was discharged as slag, making it impossible to recover lithium without additional processes for slag.

Examples 6-10

In Examples 6 to 10, the recovery rates of valuable metals were investigated based on the equivalent of the chlorinating agent.

Specifically, 100 g of shredded spent secondary batteries powder was mixed with a flux composed of $SiO_2$ and $CaCO_3$, and $CaCl_2$) as a chlorinating agent, and then a melting process was performed with injection of oxygen at 1500 degrees C. for 3 hours. The input amount of $CaCl_2$) was 26.4 g in Example 6 (the equivalent of chlorine to lithium: 1.0), 31.7 g in Example 7 (the equivalent of chlorine to lithium: 1.2), 39.6 g in Example 8 (the equivalent of chlorine to lithium: 1.5), 47.5 g in Example 9 (the equivalent of chlorine to lithium: 1.8), and 52.8 g in Example 10 (the equivalent of chlorine to lithium: 2.0).

In all of Examples 6 to 10, $SiO_2$ was added in the amount of 82.2 g. As for $CaCO_3$, it was adjusted in the amount according to the input amount of $CaCl_2$) (chlorinating agent) and was added in the amount of 33.2 g in Example 6, 28.4 g in Example 7, 21.3 g in Example 8, 14.2 g in Example 9, and 9.4 g in Example 10.

The experimental conditions and recovery rates of valuable metals in each Example are presented in Table 3.

TABLE 3

| | | Example 6 | Example 7 | Example 8 | Example 9 | Example 10 |
|---|---|---|---|---|---|---|
| Input Amount (g) | Shredded Spent Secondary Batteries | 100.0 | 100.0 | 100.0 | 100.0 | 100.0 |
| | $SiO_2$ | 82.2 | 82.2 | 82.2 | 82.2 | 82.2 |
| | $CaCO_3$ | 33.2 | 28.4 | 21.3 | 14.2 | 9.4 |
| | $CaCl_2$ | 26.4 (Equivalent of 1.0) | 31.7 (Equivalent of 1.2) | 39.6 (Equivalent of 1.5) | 47.5 (Equivalent of 1.8) | 52.8 (Equivalent of 2.0) |
| Melting Process Conditions | Temperature (degrees C.) | 1,500 | 1,500 | 1,500 | 1,500 | 1,500 |
| | Reaction Time (hr) | 3 | 3 | 3 | 3 | 3 |
| Recovery Rate (%) | Ni | 98.9 | 99.1 | 99.2 | 99.1 | 99.2 |
| | Co | 98.8 | 98.5 | 98.6 | 98.7 | 98.4 |
| | Cu | 98.5 | 98.7 | 98.7 | 98.5 | 98.7 |
| | Li | 67.1 | 90.3 | 91.5 | 91.4 | 91.7 |

As can be seen in Table 3, it was possible to recover lithium without any additional processes for slag in Examples 6 to 10. Furthermore, a higher input amount of $CaCl_2$) (chlorinating agent) resulted in a higher lithium recovery rate. In particular, in Examples 2 to 5 where the input amount of $CaCl_2$) exceeded 31.7 g (the equivalent of chlorine to lithium: 1.2) or more, a high lithium recovery rate of 90% or more was achieved.

Example 5, 11-14

In Examples 5 and 11 to 14, the recovery rates of valuable metals were investigated based on the type of the chlorinating agent.

Specifically, 100 g of shredded spent secondary batteries powder was mixed with a flux composed of $SiO_2$ and $CaCO_3$, and a chlorinating agent such that the equivalent of chlorine to lithium is 1.5, and then a melting process was performed with injection of oxygen at 1500 degrees C. for 3 hours. In Example 5, $CaCl_2$ was mixed in the amount of 39.6 g. In Example 11, $CuCl_2$ was mixed in the amount of 47.9 g. In Example 12, NaCl was mixed in the amount of 41.7 g. In Example 13, KCl was mixed in the amount of 53.2 g. In Example 14, CuCl was mixed in the amount of 70.6 g.

In all of Examples 5 and 11 to 14, $SiO_2$ was added in the amount of 82.2 g, and $CaCO_3$ was adjusted in the amount according to the input amount of the chlorinating agent. In Example 5, 21.3 g of $CaCO_3$ was added, and in Examples 11 to 14, 57.0 g of $CaCO_3$ was added.

The experimental conditions and recovery rates of valuable metals in each Example are presented in Table 4.

TABLE 4

| | | Example 5 | Example 11 | Example 12 | Example 13 | Example 14 |
|---|---|---|---|---|---|---|
| Input Amount (g) | Shredded Spent Secondary Batteries | 100.0 | 100.0 | 100.0 | 100.0 | 100.0 |
| | $SiO_2$ | 82.2 | 82.2 | 82.2 | 82.2 | 82.2 |
| | $CaCO_3$ | 21.3 | 57.0 | 57.0 | 57.0 | 57.0 |
| | Chlorinating agent | $CaCl_2$ 39.6 g (Equivalent of 1.5) | $CuCl_2$ 47.9 g (Equivalent of 1.5) | NaCl 41.7 g (Equivalent of 1.5) | KCl 53.2 g (Equivalent of 1.5) | CuCl 70.6 g (Equivalent of 1.5) |
| Melting Process Conditions | Temperature (degrees C.) | 1,500 | 1,500 | 1,500 | 1,500 | 1,500 |
| | Reaction Time (hr) | 3 | 3 | 3 | 3 | 3 |
| Recovery Rate (%) | Ni | 99.2 | 98.9 | 98.6 | 98.1 | 98.2 |
| | Co | 98.6 | 98.6 | 98.1 | 98.0 | 97.6 |
| | Cu | 98.7 | 98.2 | 98.3 | 97.7 | 97.3 |
| | Li | 91.5 | 89.2 | 72.4 | 54.3 | 73.6 |

As can be seen in Table 4, it was possible to recover lithium without any additional processes for slag in Examples 5 and 11 to 14. Furthermore, the type of the chlorinating agent affected the lithium recovery rate. In particular, in Examples 5 and 11 where $CaCl_2$) and $CuCl_2$ were added, higher lithium recovery rates were exhibited.

What is claimed is:

1. A method for recovering valuable metals from a spent secondary battery, the method comprising:
    a pre-processing process of pre-processing the spent secondary battery;
    a melting process of heating the pre-processed spent secondary battery to generate a molten solution; and
    a recovery process of recovering the valuable metals from the molten solution,
    wherein, in the melting process, a chlorinating agent is added,
    wherein, in the recovery process, lithium is recovered in a form of lithium dust, and
    wherein a slag generated in the melting process is CaO—SiO2-Al2O3 3-phase slag,
    wherein a composition of the slag is 21-28% CaO, 55-63% SiO2, and 12-17% Al2O3,
    wherein a slag composition analysis process is performed to analyze the composition of the slag generated during the melting process, and
    wherein, based on a composition analysis result of the slag, an additional input amount of flux is adjusted to achieve the slag composition of 21-28% CaO, 55-63% SiO2, and 12-17% Al2O3.

2. The method of claim 1, wherein the chlorinating agent includes at least one of $CaCl_2$, $CuCl_2$, NaCl, KCl, or CuCl.

3. The method of claim 1, wherein the chlorinating agent includes $CaCl_2$ or $CuCl_2$.

4. The method of claim 1, wherein the chlorinating agent is added such that an equivalent of chlorine to lithium present in the pre-processed spent secondary battery is 1.2 or more.

5. The method of claim 1, wherein the pre-processed spent secondary battery is heated to a temperature of 1500 degrees C. or higher in the melting process.

6. The method of claim 1, wherein the lithium dust is LiCl.

7. The method of claim 1, further comprising a spent secondary battery composition analysis process of analyzing a composition of the pre-processed spent secondary battery, and
    wherein, based on a composition analysis result of the pre-processed spent secondary battery, an input amount of flux is adjusted to achieve the slag composition of 21-28% CaO, 55-63% $SiO_2$, and 12-17% $Al_2O_3$.

8. The method of claim 1, wherein the pre-processing process includes:
    a discharge process of discharging the spent secondary battery;
    a disassembling process of disassembling the spent secondary battery from a pack to a module;
    a shredding/pulverizing process of shredding and pulverizing the disassembled spent secondary battery; and
    a drying process of drying the shredded/pulverized spent secondary battery.

* * * * *